(12) United States Patent
Furukawa et al.

(10) Patent No.: US 12,533,057 B2
(45) Date of Patent: Jan. 27, 2026

(54) BLOOD COMPONENT CONCENTRATION MEASUREMENT DEVICE

(71) Applicants: National Institute of Advanced Industrial Science and Technology, Tokyo (JP); CBC Co., Ltd., Tokyo (JP)

(72) Inventors: Hiromitsu Furukawa, Ibaraki (JP); Anri Watanabe, Ibaraki (JP); Shinichi Nakamura, Tokyo (JP); Hiroaki Aizawa, Tokyo (JP)

(73) Assignees: NATIONAL INSTITUTE OF ADVANCED INDUSTRIAL SCIENCE AND TECHNOLOGY, Tokyo (JP); CBC CO., LTD., Tokyo (JP)

( * ) Notice: Subject to any disclaimer, the term of this patent is extended or adjusted under 35 U.S.C. 154(b) by 936 days.

(21) Appl. No.: 17/771,725

(22) PCT Filed: Nov. 5, 2020

(86) PCT No.: PCT/JP2020/041394
§ 371 (c)(1),
(2) Date: Apr. 25, 2022

(87) PCT Pub. No.: WO2021/090891
PCT Pub. Date: May 14, 2021

(65) Prior Publication Data
US 2022/0369959 A1    Nov. 24, 2022

(30) Foreign Application Priority Data

Nov. 8, 2019   (JP) ................................ 2019-203020

(51) Int. Cl.
*A61B 5/1455*    (2006.01)
(52) U.S. Cl.
CPC .................................. *A61B 5/1455* (2013.01)

(58) Field of Classification Search
CPC . A61B 5/0205; A61B 5/1455; A61B 5/14551; A61B 5/14552; A61B 5/14532;
(Continued)

(56) References Cited

U.S. PATENT DOCUMENTS

| 5,957,841 | A | 9/1999 | Maruo et al. |
| 6,026,314 | A | 2/2000 | Amerov et al. |

(Continued)

FOREIGN PATENT DOCUMENTS

| JP | 4-332535 A | 11/1992 |
| JP | 9-56702 A | 3/1997 |

(Continued)

OTHER PUBLICATIONS

Japan Official Action issued in JP Application No. 2019-203020, dated Sep. 12, 2023.
(Continued)

*Primary Examiner* — Chu Chuan Liu
(74) *Attorney, Agent, or Firm* — GREENBLUM & BERNSTEIN, P.L.C.

(57) ABSTRACT

The present invention is provided with a four-wavelength light emitter that emits four kinds of wavelengths of light toward a predetermined site on a living body; a light receiver that receives the four kinds of wavelengths of light transmitted through the predetermined site on the living body; a received light intensity information acquirer that acquires received light intensity information for the four wavelengths on the basis of an optical signal received by the light receiver; an absorbance time change value acquirer that finds time change values of the absorbances corresponding to the four wavelengths on the basis of the received light intensity information of the four wavelengths; a calibration data table that stores calibration data for finding a predetermined component in blood based on the absorbance time
(Continued)

change values; and a component concentration acquirer that finds the concentration of the predetermined component in the blood.

5 Claims, 4 Drawing Sheets

(58) Field of Classification Search
CPC ............ A61B 5/14535; A61B 5/14542; A61B 5/1495
See application file for complete search history.

(56) References Cited

U.S. PATENT DOCUMENTS

| | | | |
|---|---|---|---|
| 6,625,480 | B2 | 9/2003 | Hwang et al. |
| 2003/0023151 | A1 | 1/2003 | Khalil et al. |
| 2014/0012103 | A1 | 1/2014 | Nshida et al. |
| 2016/0367173 | A1 | 12/2016 | Dalvi et al. |
| 2017/0027526 | A1* | 2/2017 | Maruo ............... A61B 5/14532 |

FOREIGN PATENT DOCUMENTS

| | | |
|---|---|---|
| JP | 10-216112 A | 8/1998 |
| JP | 11-128209 A | 5/1999 |
| JP | 2008-289807 A | 12/2008 |
| JP | 2010-66280 A | 3/2010 |
| JP | 2014-18478 A | 2/2014 |
| KR | 10-2019-0098580 | 8/2019 |

OTHER PUBLICATIONS

Extended European Search Report issued in EPO Patent Application No. 20885303.6, dated Oct. 13, 2023.
Korean Official Action received in KR Application No. 10-2022-7015356, dated May 29, 2024.
Official Communication issued in International Bureau of WIPO Patent Application No. PCT/JP2020/041394, dated Dec. 15, 2020, along with an English translation thereof.
China, Office Opinion Notice received in CN Application No. 202080075430.3, dated Aug. 31, 2024.
Korean Office Action received in KR Application No. 10-2022-7015356, dated Feb. 24, 2025, and English language translation thereof.

* cited by examiner

| Absorbance time change value | Calibration data value |
|---|---|
| A | a |
| B | b |
| C | c |
| D | d |

BLOOD COMPONENT CONCENTRATION MEASUREMENT DEVICE

FIELD OF THE INVENTION

The present invention relates to a blood component concentration measurement device.

BACKGROUND OF THE INVENTION

Patent Literature 1 discloses a glucose concentration quantification device that accurately performs quantitative analysis of glucose concentration by taking account of a disturbance factor. The device is provided with an arithmetic calculator for performing regression analysis of glucose concentration on the basis of a signal obtained by a detector detecting near-infrared light transmitted or diffused and reflected by biological tissue or bodily fluid. The arithmetic calculator uses a continuous spectrum signal as an explanatory variable, the continuous spectrum signal being obtained by continuously measuring wavelengths in at least three adjacent regions including a first wavelength region, a second wavelength region, and a third wavelength region in a wavelength range of 1480 nm to 1880 nm, where a first harmonic of a molecule can be observed and the influence of water absorption is comparatively small, and quantifies the glucose concentration as a target variable.

The first wavelength region is 1550 nm to 1650 nm for measuring absorption derived from the OH groups of a glucose molecule, the second wavelength region is 1480 nm to 1550 nm for measuring absorption derived from an NH group of a biological component, and the third wavelength region is 1650 nm to 1880 nm for measuring absorption derived from a CH group of the biological component.

Patent Literature 2 discloses a highly accurate non-invasive biochemical measurement device capable of measuring information on attenuation of light in a wide range of wavelengths in a living body simultaneously at the same location. Specifically, light emitted from four light sources is introduced into four optical fibers through four lenses, and is multiplexed by a multiplexing element and introduced into one optical fiber. Further, the light is fired through a lens at the same point on a biological sample and is detected by a photodetector.

An output current of the photodetector is converted to a voltage signal by a current-voltage conversion circuit, and is converted to a digital signal by an analog-digital converter. A signal processing device controls a light source driving circuit, calculates the degree of attenuation of each wavelength due to the biological sample, and calculates the oxygen saturation, blood flow rate, and glucose concentration in the living body.

Further, Patent Literature 3 discloses a device capable of accurately measuring bilirubin concentration in the blood without requiring blood collection. Specifically, a first light emitter, a second light emitter, a third light emitter, and a fourth light emitter are provided, and light is emitted from the light emitters toward a measurement site. The first light emitter has a wavelength that is absorbed by reduced hemoglobin, oxidized hemoglobin, and bilirubin in the blood. The second light emitter has a wavelength that is absorbed by at least reduced hemoglobin from among reduced hemoglobin, oxidized hemoglobin, and bilirubin in the blood.

In addition, the third light emitter has a wavelength that is absorbed by at least oxidized hemoglobin from among reduced hemoglobin, oxidized hemoglobin, and bilirubin in the blood. The fourth light emitter has a wavelength that is absorbed only by water and is not absorbed by reduced hemoglobin, oxidized hemoglobin, and bilirubin in the blood. Furthermore, the device is provided with a light receiver for receiving the light emitted from the light emitters and transmitted through the measurement site and converting the light into an electric signal, and a signal generator for generating signals corresponding to a transmission quantity of each of the first light, second light, third light, and fourth light on the basis of an output signal of the light receiver. Moreover, a calculator is provided that calculates the bilirubin concentration in the blood on the basis of each signal generated by the signal generator at a first time and each signal generated by the signal generator at a second time different from the first time.

RELATED ART

Patent Literature

Patent Literature 1: Japanese Patent Laid-open Publication No. 2010-66280
Patent Literature 2: Japanese Patent Laid-open Publication No. H10-216112
Patent Literature 3: Japanese Patent Laid-open Publication No. H4-332535

SUMMARY OF THE INVENTION

Problems to be Solved by the Invention

Although the invention of Patent Document 1 has an advantage in that the light source is near-infrared light and a light source emitting light over a wide wavelength range is unnecessary, accurate measurement of each wavelength region is required.

In addition, in the invention of Patent Document 2, the glucose concentration is found by applying a multivariate analysis method, but oxygen saturation, blood flow rate, and glucose concentration are obtained, and the invention does not find only the glucose concentration.

Further, the invention of Patent Document 3 finds C(Hb): blood Hb (reduced hemoglobin) concentration, $C(HbO_2)$: blood $HbO_2$ (oxidized hemoglobin) concentration, C(Bil): blood bilirubin concentration by using a set of three simultaneous linear equations, and the invention does not obtain a single value to be measured.

The present embodiment provides a blood component concentration measurement device capable of shortening measurement time and accurately measuring concentration of a predetermined component in blood.

Means for Solving the Problems

The present embodiment is provided with a four-wavelength light emitter that emits four kinds of wavelengths of light toward a predetermined site on a living body; a light receiver that receives the four kinds of wavelengths of light transmitted through the predetermined site on the living body; a received light intensity information acquirer that acquires received light intensity information for the four wavelengths on the basis of an optical signal received by the light receiver; an absorbance time change value acquirer that finds time change values of the absorbances corresponding to the four wavelengths on the basis of the received light intensity information of the four wavelengths; a calibration data table that stores calibration data for finding a predetermined component in blood based on the absorbance time change values; and a component concentration acquirer that finds the concentration of the predetermined component in the blood based on the absorbance time change values acquired by the absorbance time change value acquirer using the calibration data of the calibration data table.

MODE FOR CARRYING OUT THE INVENTION

Figure 1:
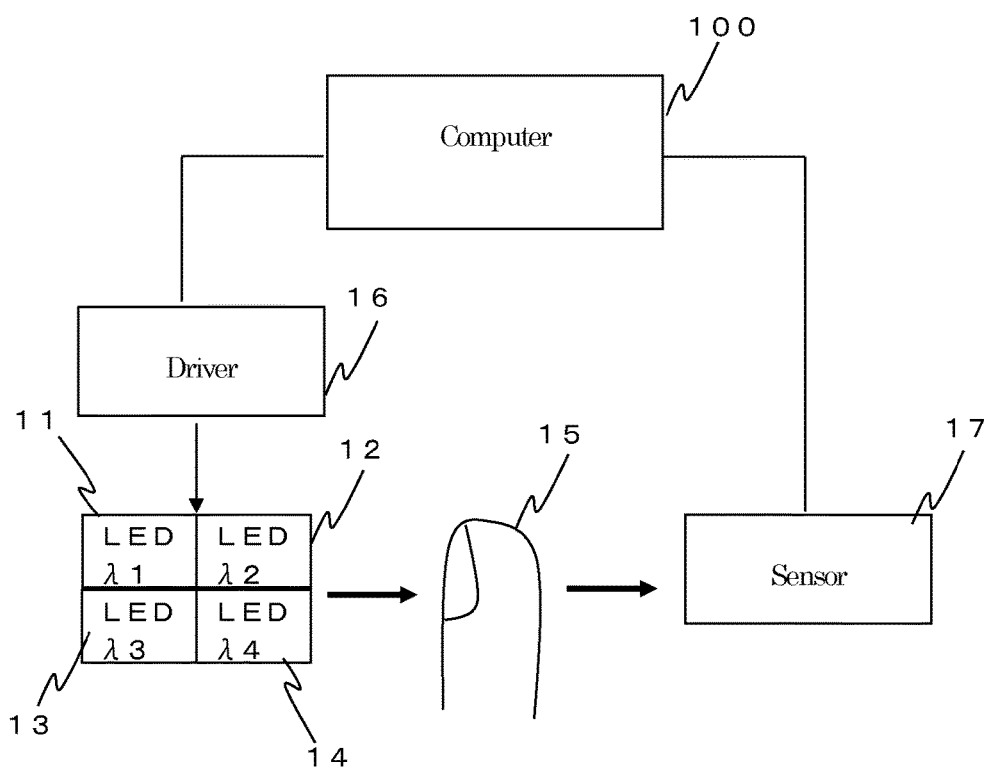
FIG. 1 is a configuration diagram of a blood component concentration measurement device according to an embodiment of the present invention.

Hereinafter, an embodiment of a blood component concentration measurement device according to the present invention is described with reference to the attached drawings. In each figure, the same components are assigned the same reference numerals and redundant descriptions thereof are omitted. FIG. 1 shows a configuration diagram of a blood component concentration measurement device according to an embodiment of the present invention. In the present embodiment, four LEDs 11, 12, 13, and 14 are used as a four-wavelength light emitter.

The LEDs 11, 12, 13, and 14 emit four different wavelengths of light toward a fingertip 15 as a predetermined site on a living body. An absorption wavelength for a blood component that is to be measured, an absorption wavelength for a blood component affecting the component to be measured, an absorption wavelength for water, and a wavelength that is not affected by the component to be measured, the blood component affecting the component to be measured, the water, and other biological components can be selected as the four wavelengths.

In the present embodiment, blood sugar level is measured as the component concentration that is to be measured. Therefore, as the four wavelengths, 1620 to 1680 nm can be selected as the absorption wavelength for sugar, which is the blood component that is to be measured; a lipid absorption wavelength of 1170 to 1230 nm can be selected as the blood component affecting the component to be measured; 1420 to 1480 nm can be selected as the absorption wavelength for water; and 1020 to 1180 nm can be selected as the wavelength that is not affected by the exemplary 1170 to 1230 nm absorbed by the lipid as the blood component affecting sugar, which is the component to be measured, by the water, and by other biological components.

When the wavelengths are adapted to the LEDs 11, 12, 13, and 14, a wavelength of light emitted from the LED 11 can use, for example, 1020 to 1180 nm, which is not absorbed by anything, and a wavelength of light emitted from the LED 12 can use, for example, 1170 to 1230 nm, which is absorbed by the lipid. A wavelength of light emitted from the LED 13 can use, for example, 1420 to 1480 nm, which is absorbed by water, and a wavelength of light emitted from the LED 14 can use, for example, 1620 to 1680 nm, which is absorbed by sugar.

The LEDs 11, 12, 13, and 14 are connected to a driver 16 that is operated by control of a computer 100 such as a personal computer, for example, and are driven by the driver 16 to emit light.

Light transmitted through the fingertip 15 is received by a sensor (optical sensor) 17 as a light receiver. The light receiver receives the four wavelengths of light transmitted through the predetermined site on the living body. The sensor 17 is connected to the computer 100 and an optical signal detected by the sensor 17 is captured by the computer 100.

Figure 2:
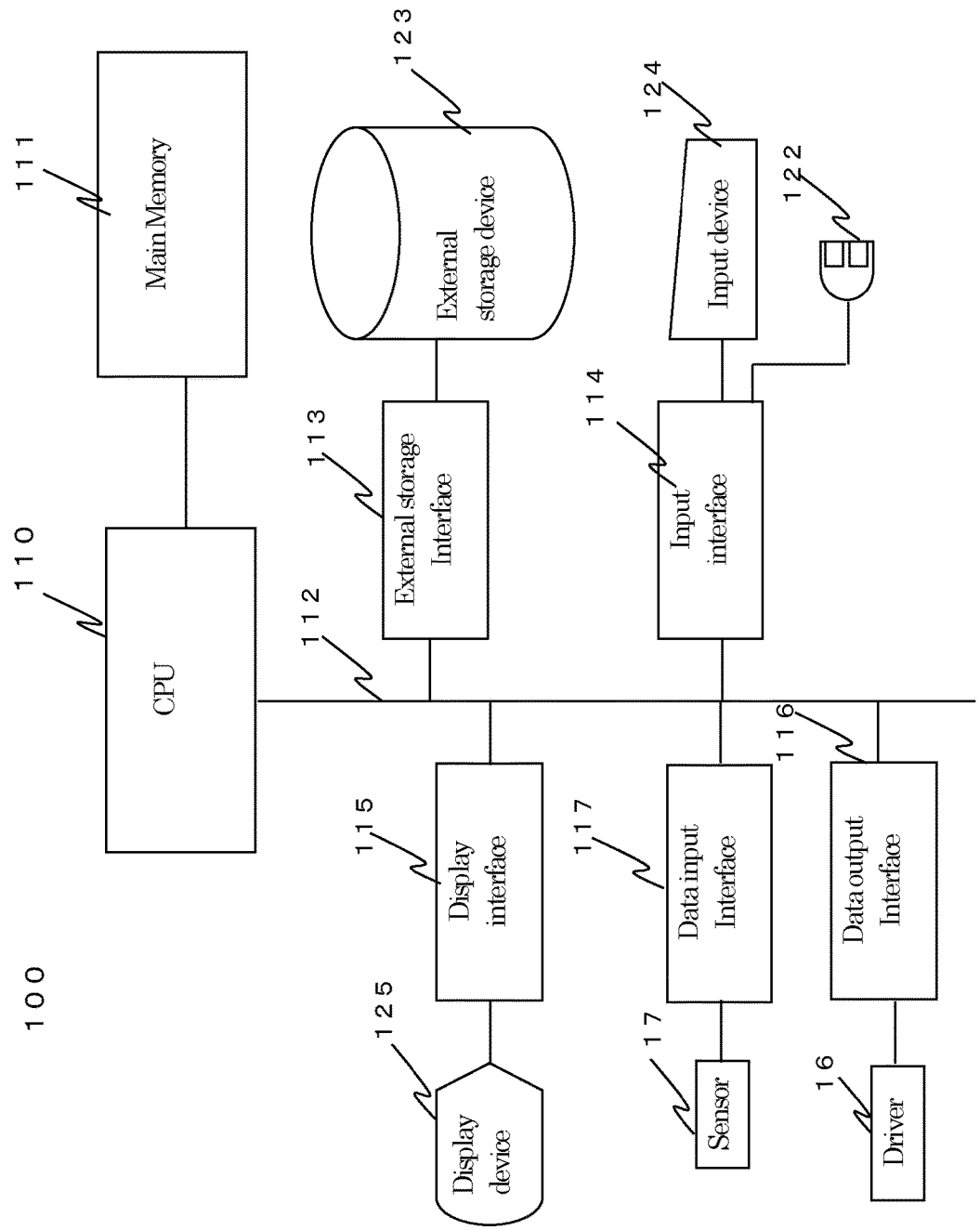
FIG. 2 is a configuration diagram of a computer portion of the blood component concentration measurement device according to the embodiment of the present invention.

FIG. 2 illustrates a configuration of the computer 100 portion of a blood sugar level measurement device that is the blood component concentration measurement device according to the present embodiment (hereinafter simply referred to as the blood sugar level measurement device). The computer 100 is configured around a CPU 110 and reads a program, data, or the like in a main memory 111 to run a process. The CPU 110 is connected via a bus 112 to an external storage interface 113, an input interface 114, a display interface 115, a data output interface 116, and a data input interface 117.

An external storage device 123 storing various data and a program the CPU 110 reads for processing as the blood sugar level measurement device is connected to the external storage interface 113. An input device 124 such as a keyboard and a pointing device 122 such as a mouse are connected to the input interface 114. A display device 125 such as an LED display is connected to the display interface 115 and displays a required image, character, or the like. The display interface 115 may broadly be an output device interface, and an output device such as a printer can be connected to the display device 115 in addition to the display device 125.

The driver 16 described above is connected to the data output interface 116, a drive control signal is sent from the data output interface 116 to the driver 16 in accordance with driving data from the CPU, and a required LED from among the LEDs 11, 12, 13, and 14 emits light for a required time in accordance with the signal to the driver 16. A sensor 17 is connected to the data input interface 117, and the output signal of the sensor 17 is captured, and is also AD-converted and sent to the CPU 110 as received light intensity information (data). Therefore, the data input interface 117 serves as a received light intensity information acquirer that acquires received light intensity information for the four wavelengths on the basis of the optical signal received by the sensor 17 as the light receiver.

Figures 3, 4:
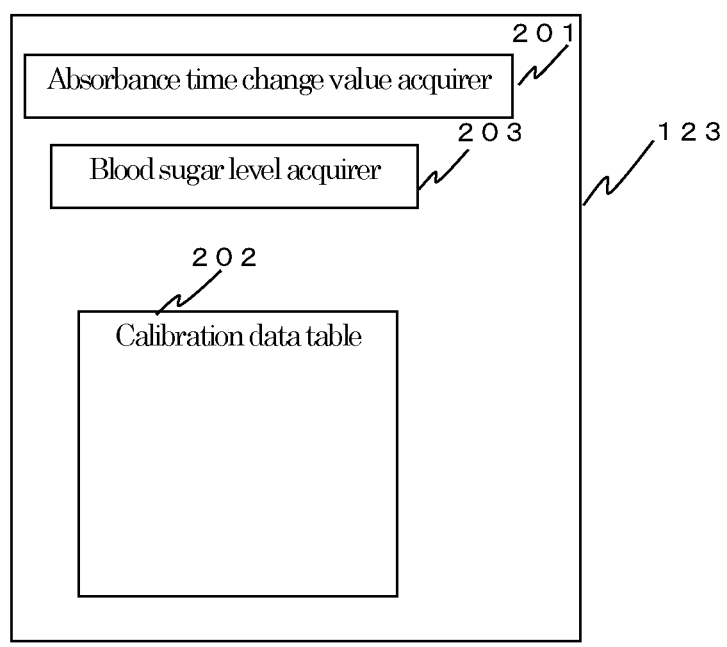
FIG. 3 is a configuration diagram of elements stored in an external storage device of the computer portion of the blood component concentration measurement device according to the embodiment of the present invention.
FIG. 4 is a diagram illustrating exemplary content in a calibration data table provided to the blood component concentration measurement device according to the embodiment of the present invention.

As previously described, the external storage device 123 stores various data and the program the CPU 110 reads for processing as the blood sugar level measurement device. Specifically, an absorbance time change value acquirer 201 realized by a program, a calibration data table 202, and a blood sugar level acquirer (in general terms, a component concentration acquirer) 203 realized by a program are provided as shown in FIG. 3. The absorbance time change value acquirer 201 finds time change values of the absorbances corresponding to the four wavelengths on the basis of the received light intensity information of the four wavelengths acquired by the data input interface 117 as the received light intensity information acquirer.

The calibration data table 202 stores calibration data for finding a blood sugar level based on the absorbance time change values. Specifically, the calibration data table 202 is a table where numerical values (alphabet letters are numerical values) for calibration data a, b, c, d, . . . are associated with absorbance time change values A, B, C, D, . . . as shown in FIG. 4.

To begin, the calibration data table 202 obtains blood data for a fairly large number of people using a method according to the present embodiment, and also stores calibration data created on the basis of the blood data and a blood sugar level obtained by a well-known method including an invasive method, and then starts. Then, based on the blood sugar level obtained by the method of the present embodiment and the blood sugar level obtained by the well-known method including the invasive method, the calibration data can be updated by a method such as statistical analysis or machine learning, for example, and can provide a high degree of accuracy.

The blood sugar level acquirer 203 finds the blood sugar level based on the absorbance time change values acquired by the absorbance time change value acquirer 201 using the calibration data of the calibration data table 202. When the absorbance time change value acquirer 201 acquires a time change value of the absorbance as, for example, aba, a calibration data value BB is retrieved from the calibration data table 202 in FIG. 3, and a predetermined calculation (addition, multiplication, division, or the like) using the calibration data value BB is performed on the acquired time change value aba of the absorbance to find the blood sugar level.

The blood sugar level found in the above way can be converted to display data by the CPU 110 and sent to the display interface 115. Once received, the display interface 115 can control the display device 125 to display the blood sugar level on the display device 125.

Figure 5:
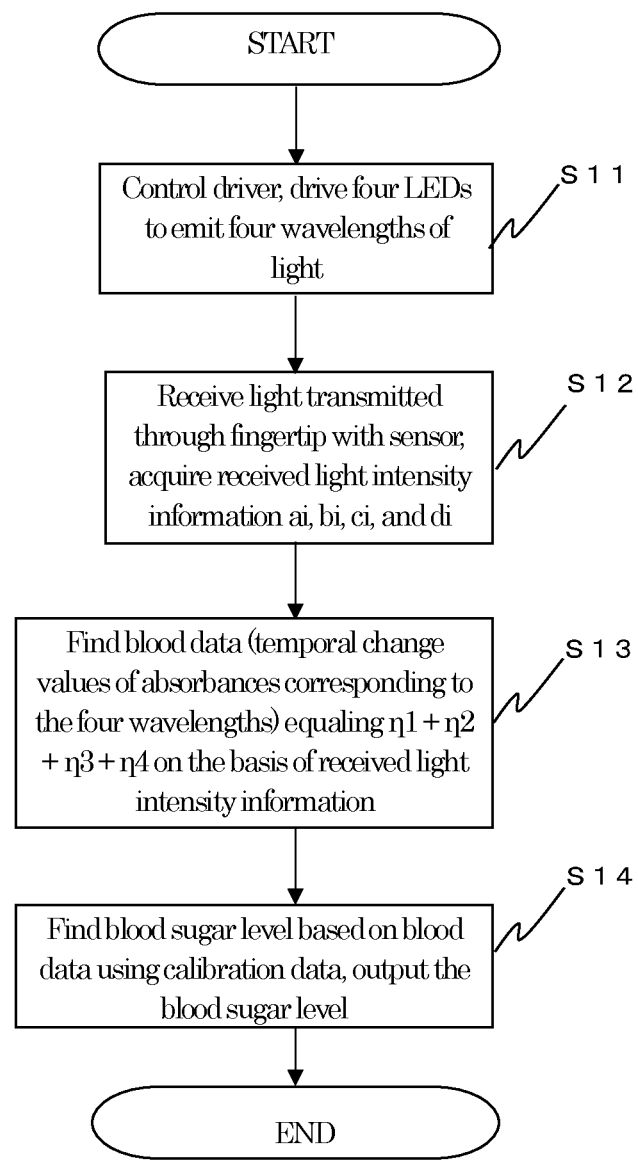
FIG. 5 is a flowchart illustrating operations of the blood component concentration measurement device according to the embodiment of the present invention.

Since the blood sugar level measurement device configured as described above performs operations according to a flowchart shown in FIG. 5, the operations are described using this flowchart. When operation starts, the CPU 110 controls the driver 16, and the four LEDs 11 to 14 are driven to emit four wavelengths of light (S11). In this example, the four LEDs 11 to 14 are driven, in order, for a predetermined time, and light of four wavelengths λ1, λ2, λ3, and λ4 is emitted toward the fingertip 15 in a predetermined time unit.

In the present embodiment, the blood sugar level is found using the absorbance of four wavelengths. As a method for doing so, statistical analysis including multivariate analysis can be used, but the present invention is not limited to this and may, for example, use machine learning. For example, the following can be considered as methods using statistical analysis. After step S11, light transmitted through the fingertip 15 is received by the sensor 17 and received light intensity information ai, bi, ci, and di is acquired (S12). Blood data, which is the temporal change values of the absorbances corresponding to the four wavelengths, equaling η1+η2+η3+η4 is found on the basis of the received light intensity information ai, bi, ci, and di (S13).

In the present embodiment, at least one pulse is measured for each wavelength. For example, when the wavelengths are measured by switching as follows, λ1 nm→λ2 nm→λ3 nm→λ4 nm, the measurement points of the four wavelengths that are separate up to this time are plotted in a single point plot. Next, when the wavelengths are measured by switching λ1 nm→λ2 nm→λ3 nm→λ4 nm, the measurement points of the four wavelengths up to this time are plotted in a two point plot. Next, when the wavelengths are measured by switching λ1 nm→λ2 nm→λ3 nm→λ4 nm, the measurement points of the four wavelengths up to this time are plotted in a three point plot. Measurement is performed similarly thereafter to obtain a plot of a desired number of points (for example, 20).

By linking the desired number of plots described above, a peak in the pulse can be created in each of the wavelengths λ1, λ2, λ3, and λ4. The measurement is performed until one or more peaks in the pulse (a uniform number of peaks in each of the wavelengths, even in cases with 50 or 100 peaks, for example) can be created, and this is adopted as one set of time series data. One set of time series data of this kind is obtained before a meal, the next set of time series data is obtained after the meal, the next set of time series data is obtained at a predetermined time (for example, three hours) after eating, and so on to acquire time series data over a longer time scale.

When ωλj (j=1 to 4) is a weighting coefficient at a wavelength λj, intermediate parameters pA, pB, pC, and pD in the following expression (1) are found using singular value decomposition, and absorbance time change values are found on the basis of the intermediate parameters pA, pB, pC, and pD obtained.

[Equation 1]

$$\begin{pmatrix} pA \\ pB \\ pC \\ pD \end{pmatrix} = \begin{pmatrix} a_1 & b_1 & c_1 & d_1 \\ a_2 & b_2 & c_2 & d_2 \\ a_3 & b_3 & c_3 & d_3 \\ a_4 & b_4 & c_4 & d_4 \end{pmatrix} \begin{pmatrix} \omega_{\lambda_1} \\ \omega_{\lambda_2} \\ \omega_{\lambda_3} \\ \omega_{\lambda_4} \end{pmatrix} \quad (1)$$

Expression (1) is equivalent to the following expression (2).

Intermediate parameter $pA = a_1 * \omega_{\lambda_1} + a_2 * \omega_{\lambda_2} + a_3 * \omega_{\lambda_3} + a_4 * \omega_{\lambda_4}$ Intermediate parameter $pA = b_1 * \omega_{\lambda_1} + b_2 * \omega_{\lambda_2} + b_3 * \omega_{\lambda_3} + b_4 * \omega_{\lambda_4}$ Intermediate parameter $pA = c_1 * \omega_{\lambda_1} + c_2 * \omega_{\lambda_2} + c_3 * \omega_{\lambda_3} + c_4 * \omega_{\lambda_4}$ Intermediate parameter $pA = d_1 * \omega_{\lambda_1} + d_2 * \omega_{\lambda_2} + d_3 * \omega_{\lambda_3} + d_4 * \omega_{\lambda_4}$ (2)[Equation 2]

Of the intermediate parameters in expression (2), above, the parameter that corresponds to the time series data at a given time t1 in the previously described time series data is represented by the following expression (3):

Intermediate parameter $pA = a_1 * \omega_{\lambda_1} + a_2 * \omega_{\lambda_2} + a_3 * \omega_{\lambda_3} + a_4 * \omega_{\lambda_4}$ (3)[Equation 3]

the parameter that corresponds to the time series data measured at a time t2 later than the time t1 in the time series data described previously is represented by the following expression (4):

Intermediate parameter $pB = b_1 * \omega_{\lambda_1} + b_2 * \omega_{\lambda_2} + b_3 * \omega_{\lambda_3} + b_4 * \omega_{\lambda_4}$ (4)[Equation 4]

and for t1, t2, and so on, the time t1 corresponds to a time prior to a meal and t2 corresponds to a time immediately after the meal, for example. Similarly for the remainder, an intermediate parameter expression can be created from one set of time series data.

The received light intensity information ai, bi, ci, and di detected as described above includes noise, and therefore can be measured for one or more pulses. When measurement is performed two or more times, the matrix of expression (1) does not form a diagonal matrix.

Given this, in the present embodiment, the intermediate parameters pA, pB, pC, and pD are found using singular value decomposition. The processing for repeatedly finding the optimal solution that yields the longest values for the intermediate parameters pA, pB, pC, and pD can be performed for each measurement when there are four or more measurements. The operation is performed by the absorbance time change value acquirer 201.

Further, when the absorbance time change value is blood data and the blood data equals η1+η2+η3+η4, the absorbance time change value acquirer 201 uses undetermined multipliers χ1, χ2, χ3, and χ4 to find η1, η2, η3, and η4 by the Lagrange multiplier method in the following expression (5).

$$\eta_1 = \chi_1 * pA + pB + pC + pD$$

$$\eta_2 = pA + \chi_2 * pB + pC + pD$$

$$\eta_3 = pA + pB + \chi_3 * pC + pD$$

$$\eta_4 = pA + pB + pC + \chi_4 * pD \quad (5)[\text{Equation 5}]$$

As described above, when the blood data equaling η1+η2+η3+η4 is found, the blood sugar level is found using the calibration data of the calibration data table 202 and is output from the display device 125 (S14).

The calibration data and the blood sugar level obtained in this way are fed back to the calibration data table 202 and the accuracy of the calibration data is increased. In this way, the received light intensity information ai, bi, ci, and di is acquired from the optical signal actually transmitted through the fingertip, and the blood sugar level is found by calculation using the calibration data, and therefore the magnitude of the absorbance caused by a pulse wave component can be reflected and the blood sugar level can be appropriately measured regardless of the person taking the measurement.

In the present embodiment, one computer controls the light emission of the LEDs, acquires the received light intensity information ai, bi, ci, and di after the transmitted light is received, also acquires the blood data, and still further calculates the blood sugar level using the calibration data, but each of these may be configured to be handled by separate computers or control devices, and some operations may be grouped together and distributed across two or three computers. In this case, the acquisition of the blood data and also the calculation of the blood sugar level using the calibration data can be performed by locating one computer remotely, and the control of the light emission of the LEDs and acquisition of the received light intensity information ai, bi, ci, and di after the transmitted light is received can be performed at a plurality of sites. With such a system, data for a large number of people can be concentrated on a computer at one site to properly update the calibration data.

The above embodiment describes a blood sugar level measurement device for finding a blood sugar level as the "concentration of the predetermined component in the blood," but the present invention is not limited to this. For example, it is expected that blood lipid concentration, blood cholesterol concentration, and the like can also be measured.

Additionally, in the above description, the computer 100 is configured as a personal computer or the like, but the blood component concentration measurement device according to the present embodiment may be a dedicated device, and the computer 100 may be configured as a dedicated CPU. In this case, the data and the program necessary for processing as the blood sugar level measurement device may be stored in the main memory 111.

In addition, a determination device for determining normality, abnormality, and a warning level on the basis of the result measured by the blood component concentration measurement device according to the present embodiment may be provided on a network, the result measured by the blood component concentration measurement device according to the present embodiment may be sent to the determination device via the network, and the determination result may be returned. Needless to say, a storage device may be provided for storing the determination result rather than the determination device, and a doctor may access the storage device by using the network to make a determination, and store the determination result in the storage device, and the blood component concentration measurement device according to the present embodiment may retrieve the result and provide a display or the like.

DESCRIPTION OF REFERENCE NUMERALS

11 to 14 LED
15 Fingertip
16 Driver
17 Sensor
100 Computer
110 CPU
111 Main memory
112 Bus
113 External storage interface
114 Input interface
115 Display interface
116 Data output interface
117 Data input interface
122 Pointing device
123 External storage device
124 Input device
125 Display device
201 Absorbance time change value acquirer
202 Calibration data table
203 Blood sugar level acquirer (component concentration acquirer)

The invention claimed is:

1. A blood component concentration measurement device comprising:
    four LEDs that are configured to be driven, in order, for a predetermined time, wherein each of the four LEDs is configured to emit a different wavelength of light toward a predetermined site on a living body;
    a light receiver that is configured to receive light that is emitted from each of the four LEDs and transmitted though the predetermined site on the living body,
    a data input interface that receives an output from the light receiver corresponding to the different wavelength of light emitted by each of the four LEDs, wherein the data input interface obtains light data on the different wavelength of light emitted by each of the four LEDs and performs A/D conversion to convert the light data into light intensity information;
    a central processing unit; and
    a non-transitory computer-readable recording medium that stores executable instructions that define an absorbance time change value acquirer and that define a component concentration acquirer,
    the executable instructions that define the absorbance time change value acquirer cause the central processing unit to compute an intermediate parameter using the following equation:

$$\begin{pmatrix} pA \\ pB \\ pC \\ pD \end{pmatrix} = \begin{pmatrix} a_1 & b_1 & c_1 & d_1 \\ a_2 & b_2 & c_2 & d_2 \\ a_3 & b_3 & c_3 & d_3 \\ a_4 & b_4 & c_4 & d_4 \end{pmatrix} \begin{pmatrix} \omega_{\lambda_1} \\ \omega_{\lambda_2} \\ \omega_{\lambda_3} \\ \omega_{\lambda_4} \end{pmatrix} \quad (1)$$

wherein the equation is defined by the intermediate parameter (i.e., pA, pB, pC, and pD) using the light data (i.e., a1-a4, b1-b4, c1-c4, and d1-d4) on the different wavelength of light emitted by each of the four LEDs which is obtained by the data input interface, and a weighting coefficient (i.e., ωλ1-4) for the different wavelength of light emitted by each of the four LEDs, wherein the equation determines the value of the intermediate parameter using singular value decomposition and an absorbance time change value for each of the different wavelength of light emitted by each of the four LEDs, wherein the absorbance time change value is one piece of data that is based on the determined value of the intermediate parameter;

a calibration data table that stores calibration data for finding a predetermined component in blood based on the absorbance time change value for each of the different wavelength of light emitted by each of the four LEDs; and the executable instructions that define the component concentration acquirer cause the central processing unit to determine the concentration of the predetermined component in the blood based on the absorbance time change value for each of the different wavelength of light emitted by each of the four LEDs acquired by the absorbance time change value acquirer using the calibration data of the calibration data table.

2. The blood component concentration measurement device according to claim 1, wherein the absorbance time change value acquirer finds the time change values of the absorbances corresponding to the different wavelength of light emitted by each of the four LEDs on the basis of a plurality of continuous received light intensity information that is acquired at a fixed time interval by the received light intensity information acquirer.

3. The blood component concentration measurement device according to claim 1, wherein the absorbance time change value acquirer finds the time change values of the absorbances corresponding to the different wavelength of light emitted by each of the four LEDs on the basis of at least one acquisition of continuous received light intensity information that is acquired at a fixed time interval for obtaining at least one set of intensity information consisting of four intensity information corresponding to the different wavelength of light emitted by each of the four LEDs by the received light intensity information acquirer.

4. The blood component concentration measurement device according to claim 1, wherein an absorption wavelength for a blood component that is to be measured, an absorption wavelength for a blood component affecting the component to be measured, an absorption wavelength for water, and a wavelength that is not affected by the component to be measured, the blood component, the water, and other biological components are selected as the different wavelength of light emitted by each of the four LEDs.

5. The blood component concentration measurement device according to claim 4, wherein 1620 to 1680 nm is selected as an absorption wavelength for the blood component that is to be measured; a lipid absorption wavelength of 1170 to 1230 nm is selected as the blood component affecting the component to be measured; 1420 to 1480 nm is selected as the absorption wavelength for water; and 1020 to 1180 nm is selected as the wavelength that is not affected by the component to be measured, the blood component, the water, and other biological components.

* * * * *